United States Patent
Hinode

(10) Patent No.: US 8,325,437 B2
(45) Date of Patent: Dec. 4, 2012

(54) IMAGE RECORDING/REPRODUCING DEVICE

(75) Inventor: Yoshihiro Hinode, Kanagawa (JP)

(73) Assignee: Panasonic Corporation, Osaka (JP)

( * ) Notice: Subject to any disclaimer, the term of this patent is extended or adjusted under 35 U.S.C. 154(b) by 938 days.

(21) Appl. No.: 12/374,582

(22) PCT Filed: Sep. 4, 2007

(86) PCT No.: PCT/JP2007/067207
§ 371 (c)(1),
(2), (4) Date: Jan. 21, 2009

(87) PCT Pub. No.: WO2008/032605
PCT Pub. Date: Mar. 20, 2008

(65) Prior Publication Data
US 2009/0316554 A1    Dec. 24, 2009

(30) Foreign Application Priority Data
Sep. 11, 2006   (JP) ................. 2006-245745

(51) Int. Cl.
*G11B 27/36* (2006.01)
*G11B 19/10* (2006.01)
(52) U.S. Cl. ........................... 360/69; 360/60
(58) Field of Classification Search ............... None
See application file for complete search history.

(56) References Cited

U.S. PATENT DOCUMENTS

| | | | | |
|---|---|---|---|---|
| 5,173,816 A * | 12/1992 | Ogihara | ......................... | 360/69 |
| 5,483,419 A * | 1/1996 | Kaczeus et al. | .......... | 361/679.39 |
| 5,675,833 A * | 10/1997 | Radko et al. | .................... | 710/17 |
| 6,178,520 B1 * | 1/2001 | DeKoning et al. | ........... | 714/5.11 |
| 6,442,638 B1 * | 8/2002 | Ain et al. | ...................... | 710/302 |
| 6,741,529 B1 * | 5/2004 | Getreuer | .................... | 369/30.17 |
| 6,876,547 B2 * | 4/2005 | McAlister | ................ | 361/679.33 |
| 6,904,495 B2 * | 6/2005 | Frantz et al. | .................. | 711/111 |
| 7,085,212 B2 * | 8/2006 | Choi et al. | ................... | 369/53.2 |

(Continued)

FOREIGN PATENT DOCUMENTS
JP   04-328347 A   11/1992
(Continued)

OTHER PUBLICATIONS
International Search Report for PCT/JP2007/067207.
(Continued)

*Primary Examiner* — Hoa T Nguyen
*Assistant Examiner* — James L Habermehl
(74) *Attorney, Agent, or Firm* — Pearne & Gordon LLP

(57) ABSTRACT

There is provided an image recording/reproducing device that can discriminate a disk separation error that is specific to removable hard disks. A disk error detector (51) detects an occurrence of a disk error depending on whether a removable hard disk (15) can be recognized or not. A mount status detector (55) detects a presence or absence of the removable hard disk (15) as a disk mount status. The mount status detector (55) may detect the disk mount status based on a detection result of a write-protect switch (19) of the removable hard disk (15). An error type discriminator (57), based on the detected disk mount status, discriminates an error type of the disk error, and determines that the error type is disk separation if the removable hard disk (15) has become nonexistent. An error handler (59) performs error handling in accordance with the error type discriminated by the error type discriminator (57).

6 Claims, 6 Drawing Sheets

U.S. PATENT DOCUMENTS 7,178,156 B2 * 2/2007 Choi et al. .................. 720/729
7,398,416 B2 * 7/2008 Manoj .......................... 714/6.1

FOREIGN PATENT DOCUMENTS

| JP | 05-325488 A | 12/1993 |
| JP | 06-089482 A | 3/1994 |
| JP | 10-320513 A | 12/1998 |
| JP | 10-334538 A | 12/1998 |
| JP | 2001-006262 A | 1/2001 |
| JP | 2004-145866 A | 5/2004 |
| JP | 2005-123796 A | 5/2005 |
| JP | 2006-155029 A | 6/2006 |

OTHER PUBLICATIONS

Japanese Office Action regarding Patent Application No. 2006-245745.

* cited by examiner (a)

(b)

(c)

IMAGE RECORDING/REPRODUCING DEVICE

RELATED APPLICATIONS

This application claims the benefit of Japanese Patent Application No. 2006-245745 filed on Sep. 11, 2006 in Japan, the subject matter of which is hereby incorporated by reference.

TECHNICAL FIELD

The present invention relates to an image recording/reproducing device for recording an image on a removable hard disk, and more particularly to a technique for detecting an error related to a removable hard disk.

BACKGROUND ART

Conventionally, image recording/reproducing devices are used in various applications, such as recording of a surveillance camera image. An image recording/reproducing device concerned here is one with a hard disk as an image recording means.

Conventionally, in common image recording/reproducing devices, their hard disks are fixed-type and are permanently fixed in the equipment. Such image recording/reproducing devices have a hard disk failure detection function for maintenance purposes to replace a failed hard disk. Specifically, conventional image recording/reproducing devices determine that a disk failure has occurred and perform error handling when they lose recognition of a hard disk being in recording operation.

The case where a hard disk cannot be recognized is typically a case where no reply is received from a hard disk even when a Write or other command is executed on the hard disk. Such an error can be determined by using a timer. When a timeout occurs due to a command error during recording operation, error handling deals with the hard disk as a failed disk.

By the way, recently removable hard disks have been put to practical use that are different from the above conventional fixed-type hard disks. A removable hard disk is a hard disk that, being intended for removable use, employs a highly impact resistant and rugged cartridge. A removable hard disk can also be applied to an image recording/reproducing device. Such an image recording/reproducing device is disclosed in Japanese Patent Laid-Open Application No. 2005-123796, for example.

However, conventional image recording/reproducing devices have a problem that, when they are provided with a removable hard disk and if they perform conventional disk error detection simply as-is, they cannot discriminate between a disk failure error and a below-described disk separation error (disk-removed error) that is specific to removable hard disks. This problem will next be described in further detail.

An operation form of a removable hard disk will be considered here. At the start of operation of a removable hard disk, the removable hard disk is inserted into an image recording/reproducing device and then an operation start action is performed. The operation start action is an operator's button operation, for example. When the operation start action is performed, the removable hard disk is initiated and recognized, and then recording or other operation starts.

At the time of replacement or the like of the removable hard disk, an operation stop action is performed and then the removable hard disk is pulled out. The operation stop action is also an operator's button operation, for example. In response to the operation stop action, a process required to stop the operation is performed inside the equipment.

The above-mentioned operation stop action is performed in order to certainly keep an image to be recorded in the removable hard disk. When the operation stop action is performed, the image recording device performs on the hard disk a process corresponding to a shutdown. At this time, management information is written into a prescribed management area of the removable hard disk, for example. This allows the disk to be in a condition in which it can be pulled out. By performing the operation stop action, a partial loss of image or the like can be prevented.

However, in image recording devices that do not have a lock mechanism for preventing the removable hard disk from being pulled out, the removable hard disk can be pulled out by mistake or intentionally without the operation stop action. In that case, the image recording/reproducing device loses recognition of the removable hard disk and determines that a disk error has occurred. A disk error due to a removable hard disk being pulled out without going through a prescribed procedure as above will be called a disk separation error (disk-removed error).

A disk separation error is an error that does not occur in conventional fixed-type hard disks and is specific to removable hard disks. A disk separation error is also an error of a different type from a usually-detected disk failure error. However, these errors could not be discriminated by simply detecting a disk error depending only on whether a hard disk can be recognized or not as is conventionally done. Therefore, a user cannot be warned of disk separation. A user might determine by mistake that a hard disk is in failure.

DISCLOSURE OF THE INVENTION

Problems to be Solved by the Invention

The invention has been made to solve the conventional problem. A purpose of the invention is to provide an image recording/reproducing device that can discriminate a disk separation error that is specific to removable hard disks.

Means for Solving the Problems

An image recording/reproducing device of the invention comprises: a disk mount in which a removable hard disk for recording an image is mounted; a disk error detector for detecting an occurrence of a disk error depending on whether the removable hard disk can be recognized or not; a mount status detector for detecting a presence or absence of the removable hard disk as a disk mount status; an error type discriminator for, based on the disk mount status detected by the mount status detector, discriminating or distinguishing an error type of the disk error detected by the disk error detector, and determining that the error type is disk separation if the removable hard disk has become nonexistent; and an error handler or processing section for performing error handling or processing in accordance with the error type discriminated by the error type discriminator.

Another aspect of the invention is a disk error detection device provided on an image recording/reproducing device having a disk mount in which a removable hard disk is mounted for recording an image, and the disk error detection device comprises: a disk error detector for detecting an occurrence of a disk error depending on whether the removable hard disk can be recognized or not; a mount status detector for detecting a presence or absence of the removable hard disk as a disk mount status; and an error type discriminator for, based on the disk mount status detected by the mount status detector, discriminating an error type of the disk error detected by the disk error detector.

Another aspect of the invention is a disk error detection method for detecting a disk error in an image recording/reproducing device having a disk mount in which a removable hard disk is mounted for recording an image, and the disk error detection method comprises: detecting an occurrence of a disk error depending on whether the removable hard disk can be recognized or not; detecting a presence or absence of the removable hard disk as a disk mount status; and discriminating an error type of the disk error based on the detected disk mount status.

ADVANTAGES OF THE INVENTION

By providing as above the mount status detector and the error type discriminator that uses a detection result obtained by the mount status detector, the invention can provide an image recording/reproducing device having an advantage in being able to discriminate a disk separation error that is specific to removable hard disks.

As described hereafter, other aspects of the invention exist. Thus, this summary of the invention is intended to provide a few aspects of the invention and is not intended to limit the scope of the invention described and claimed herein.

DESCRIPTION OF THE SYMBOLS

Figure 1:
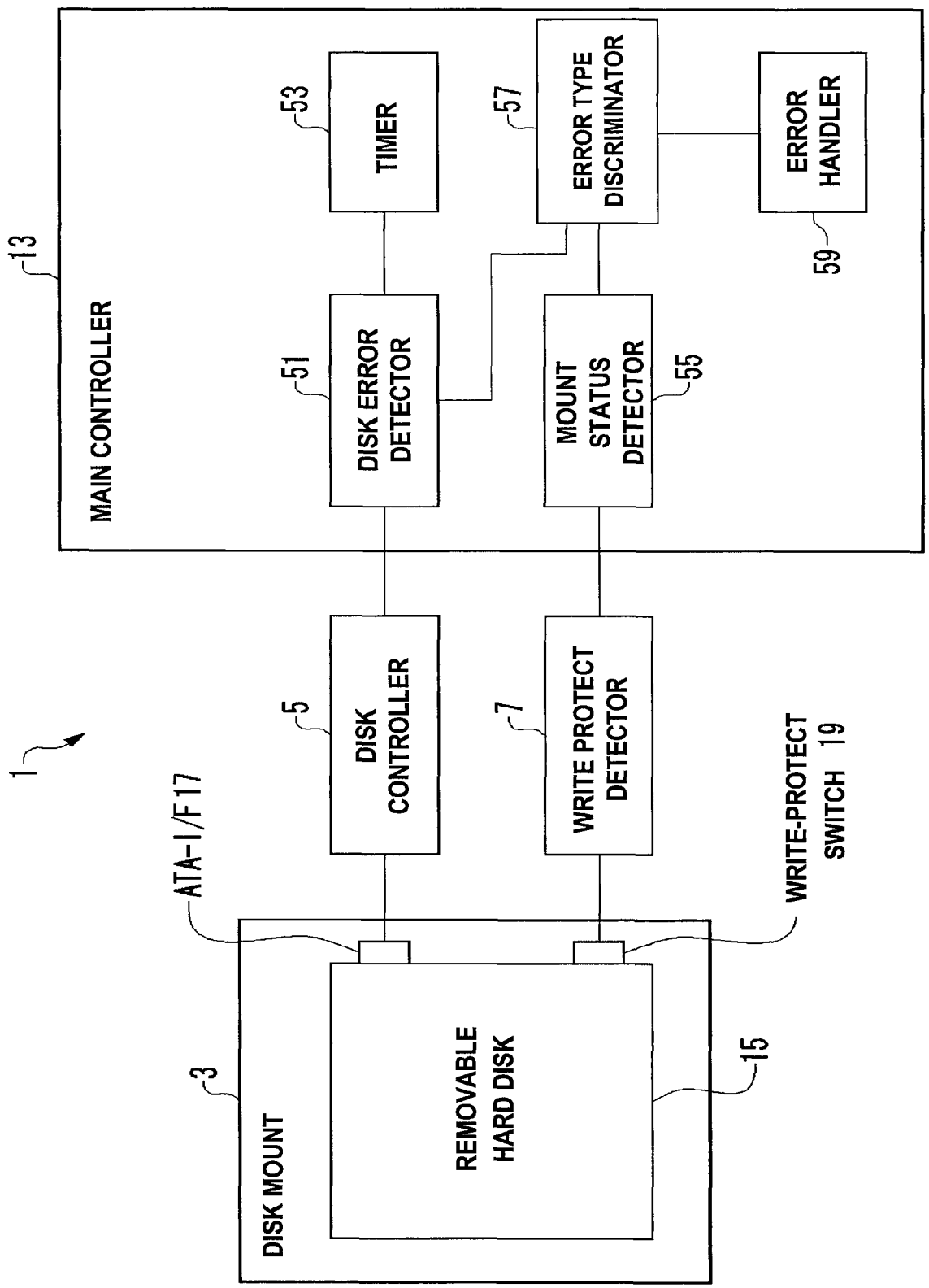
FIG. 1 is a block diagram showing an image recording/reproducing device of an embodiment of the invention.

1: Image recording/reproducing device
3: Disk mount
7: Write protect detector
9: Front operation unit
13: Main controller
15: Removable hard disk
19: Write-protect switch
21: Disk driver
23: Port driver
51: Disk error detector
53: Timer
55: Mount status detector
57: Error type discriminator
59: Error handler

BEST MODE OF EMBODYING THE INVENTION

A detailed explanation of the invention will be hereinafter described. The detailed explanation and the accompanying drawings do not limit the invention. Instead, the scope of the invention is limited by claims attached hereto.

An image recording/reproducing device of the invention comprises: a disk mount in which a removable hard disk for recording an image is mounted; a disk error detector for detecting an occurrence of a disk error depending on whether the removable hard disk can be recognized or not; a mount status detector for detecting a presence or absence of the removable hard disk as a disk mount status; an error type discriminator for, based on the disk mount status detected by the mount status detector, discriminating or distinguishing an error type of the disk error detected by the disk error detector, and determining that the error type is disk separation if the removable hard disk has become nonexistent; and an error handler or processing section for performing error handling or processing in accordance with the error type discriminated by the error type discriminator.

In this configuration, the mount status detector and the error type discriminator are provided in addition to the disk error detector. The disk error detector is configured to detect whether the removable hard disk can be electrically recognized or not, whereas the mount status detector is configured to detect a physical presence or absence of the removable hard disk as a disk mount status. Then the error type discriminator, based on the disk mount status, determines that the error type is disk separation error (disk-removed-error) if the removable hard disk has become nonexistent. The error handler then performs error handling in accordance with the error type. The error handling is, for example, sending out warnings or recording an error history. As above, by performing disk mount status detection and determination based on the detection result, an image recording/reproducing device can be provided that can discriminate a disk separation error of a removable hard disk.

In the image recording/reproducing device of the invention, if the removable hard disk exists when the disk error is detected by the disk error detector, the error type discriminator may determine that the error type is disk failure. This configuration allows a disk separation error and a disk failure error to be discriminated from each other to perform different error handling for each error.

The image recording/reproducing device of the invention may have a write protect detector for detecting a status of a write-protect switch in the removable hard disk, and the mount status detector may be configured such that it detects the disk mount status based on a detection result obtained by the write protect detector.

This configuration allows the disk mount status to be detected by using a detection mechanism for the write-protect switch and allows the disk error type to be determined. In this configuration, the detection mechanism for the write-protect switch is used for both Write Enable/Disable determination and disk error type determination. This allows an error type to be determined without increasing the number of components. Accordingly, an error type can be determined in a simple configuration.

In the image recording/reproducing device of the invention, the error handler, as the error handling, may send out warnings that differ between a disk separation error and a disk failure error. This configuration allows an error occurrence to be dealt with quickly.

Other aspects of the invention are, for example, a disk error detection device provided on an image recording/reproducing device, and a disk error detection method. These aspects can also provide the above advantages of the invention. In these aspects also, various and more specific components of the invention may be added as in the case of the above-described image recording/reproducing device aspect.

Now, an image recording/reproducing device according to an embodiment of the invention will be described with reference to the drawings.

Figure 2:
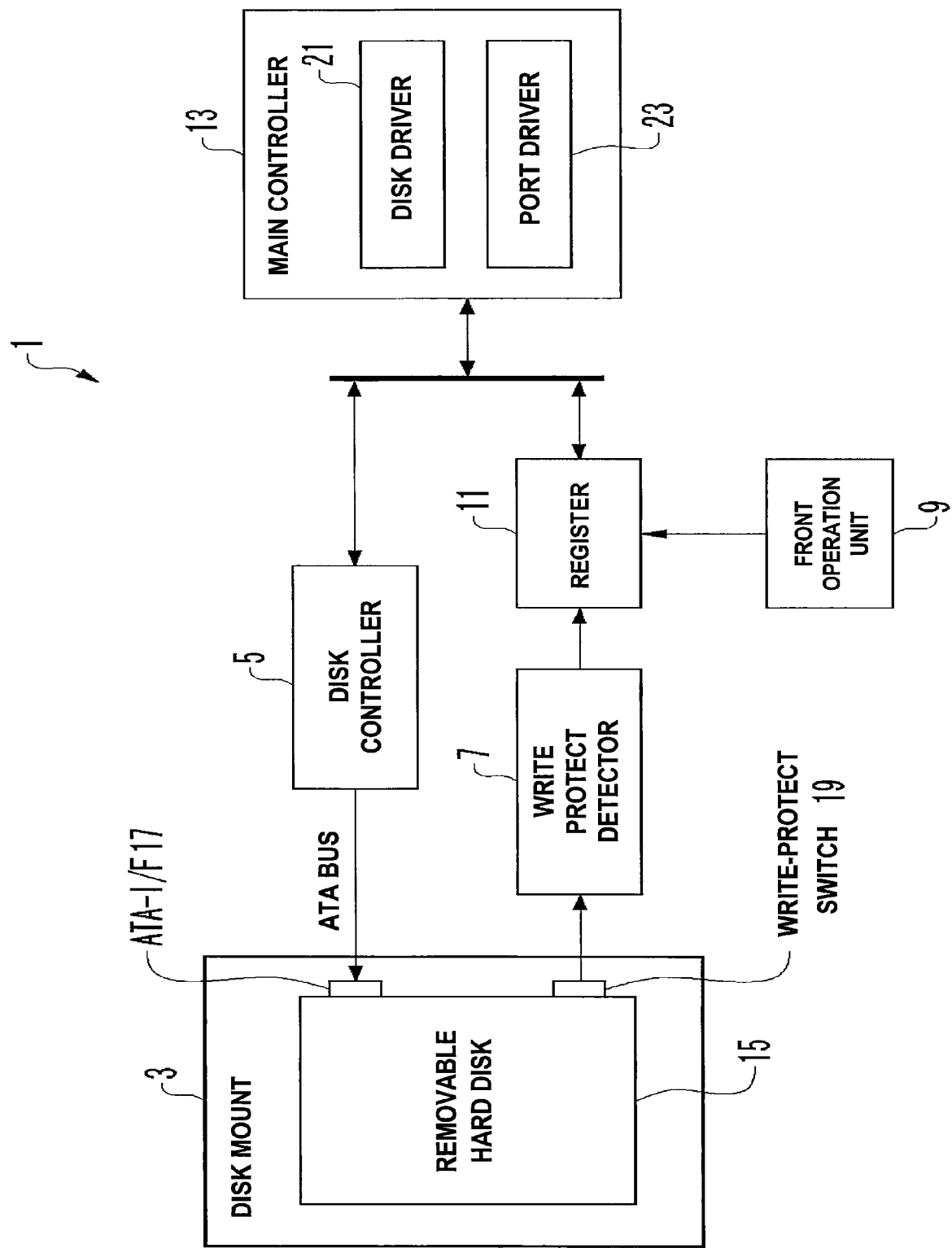
FIG. 2 is a block diagram showing the image recording/reproducing device of the embodiment of the invention.

FIGS. 1 and 2 show the image recording/reproducing device according to the embodiment of the invention. FIG. 2 is a general configuration of the image recording/reproducing device 1, and FIG. 1 shows a configuration for error detection in a main controller of the image recording/reproducing device 1.

Referring first to FIG. 2, the image recording/reproducing device 1 comprises a disk mount 3, a disk controller 5, a write protect detector 7, a front operation unit 9, a register 11, and the main controller 13.

The disk mount 3 is mounted with a removable hard disk 15. The disk mount 3 has a disk slot, for example. The disk mount 3 suitably has a structure in which the removable hard disk 15 can easily be replaced from the front face of the equipment. This allows the disk replacement to be performed actively. Though not shown in the figure, a plurality of disk mounts 3 (e.g. two disk slots) are suitably provided.

The disk controller 5 is a hardware configuration for controlling the removable hard disk 15, and is connected with an ATA interface 17 of the removable hard disk 15 via an ATA bus. The write protect detector 7 is configured to detect the status of a write-protect switch 19 provided on the removable hard disk 15. The front operation unit 9 is an operation member for a button or the like provided on the front face of the equipment. The front operation unit 9 includes an operation button that is operated by a user in an operation start action and operation stop action at the time of replacement of the removable hard disk 15.

The write protect detector 7 and the front operation unit 9 are connected with the register 11. The register 11 comprises a logic device such as a PLD (Programmable Logic Device), keeps the status of the write-protect switch detected by the write protect detector 7, and keeps information on an operation performed on the front operation unit 9.

The main controller 13 is a microprocessor comprising a CPU or the like, controls the whole equipment, controls operations, such as recording and reproduction, of the removable hard disk 15, and also performs error detection for the removable hard disk 15.

The main controller 13 is connected with the disk controller 5 and the register 11 via a local bus. The main controller 13 comprises a disk driver 21 and a port driver 23.

The disk driver 21 is configured to manage the removable hard disk 15. The disk driver 21 accesses the removable hard disk 15 via the disk controller 5, and performs a Write or other command. The function associated with the error detection of the invention may be provided in the disk driver 21. Alternatively, the function associated with the error detection of the invention may be implemented by executing on the main controller 13 a program other than the disk driver 21.

The port driver 23 polls the register 11 on a regular basis to acquire status information kept by the register 11. This allows the main controller 13 to acquire the status of the write-protect switch 19 detected by the write protect detector 7 and also acquire information on an operation of the front operation unit 9.

Figure 3A:
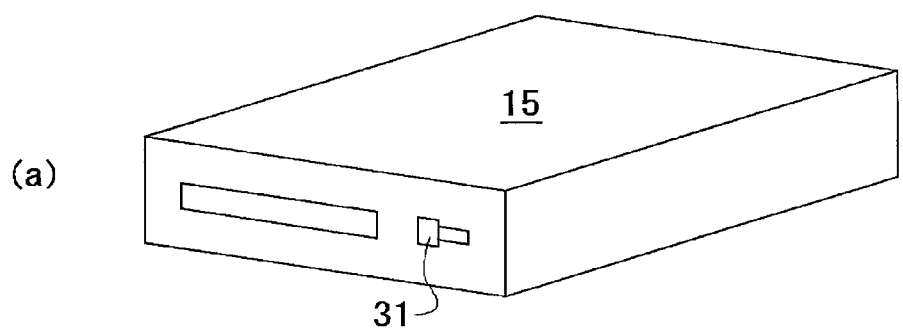
FIG. 3A shows a write-protect switch of a removable hard disk.
Figure 3B:
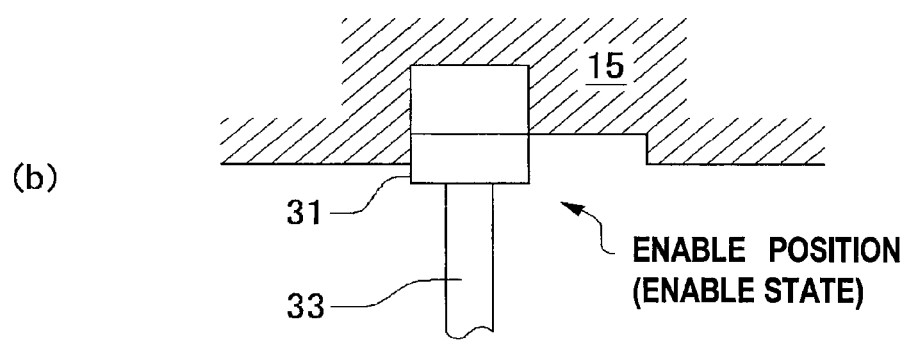
FIG. 3B shows the write-protect switch being in a Write Enable state and a detection mechanism for it.
Figure 3C:
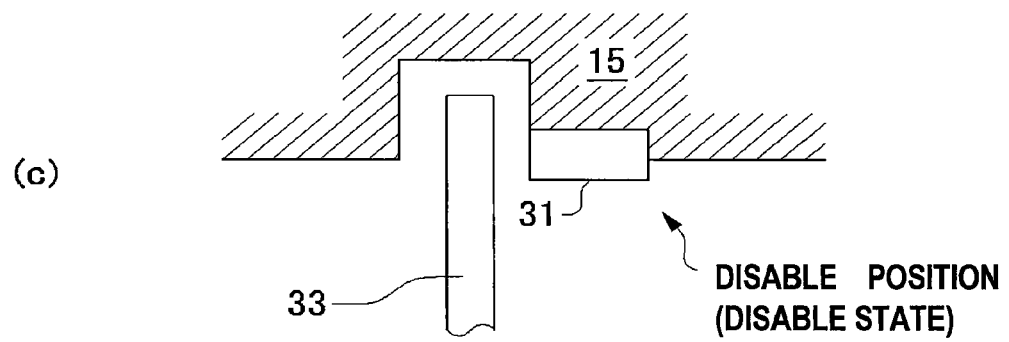
FIG. 3C shows the write-protect switch being in a Write Disable state and a detection mechanism for it.

FIGS. 3A to 3C show a configuration of the write-protect switch 19 and write protect detector 7 in FIG. 2.

As shown in FIG. 3A, the write-protect switch 19 is provided on one surface of the removable hard disk 15. In the embodiment, the write-protect switch 19 is a sliding switch, and has slide member 31. This slide member 31 is manually slid by a user. The slide member 31 is slid between the Enable position in FIG. 3B (Unlocked Position) and the Disable position in FIG. 3C (Locked Position).

The write protect detector 7 is a mechanism for physically detecting the status of the above write-protect switch 19. To be concrete, the write protect detector 7 detects whether the write-protect switch 19 is set to the Enable state or not (whether the slide member 31 is in the Enable position or not).

In the example of the figure, write protect detector 7 has a push member 33. As shown in FIG. 3B, when the write-protect switch 19 is in the Enable state, the tip of the push member 33 comes into contact with and is pushed by the slide member 31. This motion is detected by the write protect detector 7. As shown in FIG. 3C, if the write-protect switch 19 is not in the Enable state, the push member 33 goes through without coming into contact with the slide member 31. Accordingly, the Enable state is not detected.

The write protect detector 7 may have a common push switch as a configuration for detecting that the push member 33 is pushed by the slide member 31. In this case, the push switch on a substrate is pushed by the push member 33, switching between On and Off.

The write protect detector 7 may detect that the push member 33 is pushed, with another configuration. For example, it may be provided with a photointerrupter. In this case, the photointerrupter is placed such that the photointerrupter switches between On and Off when the push member 33 is pushed. Alternatively, for example, the movement of the push member 33 may be magnetically detected.

As described above, the write protect detector 7 detects whether the write-protect switch 19 is in the Enable state or not. If the Enable state is detected, the main controller 13 of the image recording/reproducing device 1 writes to the removable hard disk 15. If the Enable state is not detected, writing to the removable hard disk 15 is disabled.

By the way, the above detection mechanism of the write-protect switch 19 would not exist in a configuration having a conventional fixed-type hard disk. That is, the detection mechanism of the write-protect switch 19 is a configuration specific to the case where the removable hard disk 15 is mounted.

Moreover, the above detection mechanism can be used not only to determine Write Enable but also to detect whether a write-enabled removable hard disk 15 physically exists in the disk mount 3 or not. Consequently, the presence or absence of the removable hard disk 15 can be physically detected, aside from the electrical recognition of the removable hard disk 15 depending on the presence or absence of a reply to a Write or other command. In the invention, this will be used to detect a disk separation error as described later.

Figure 4:
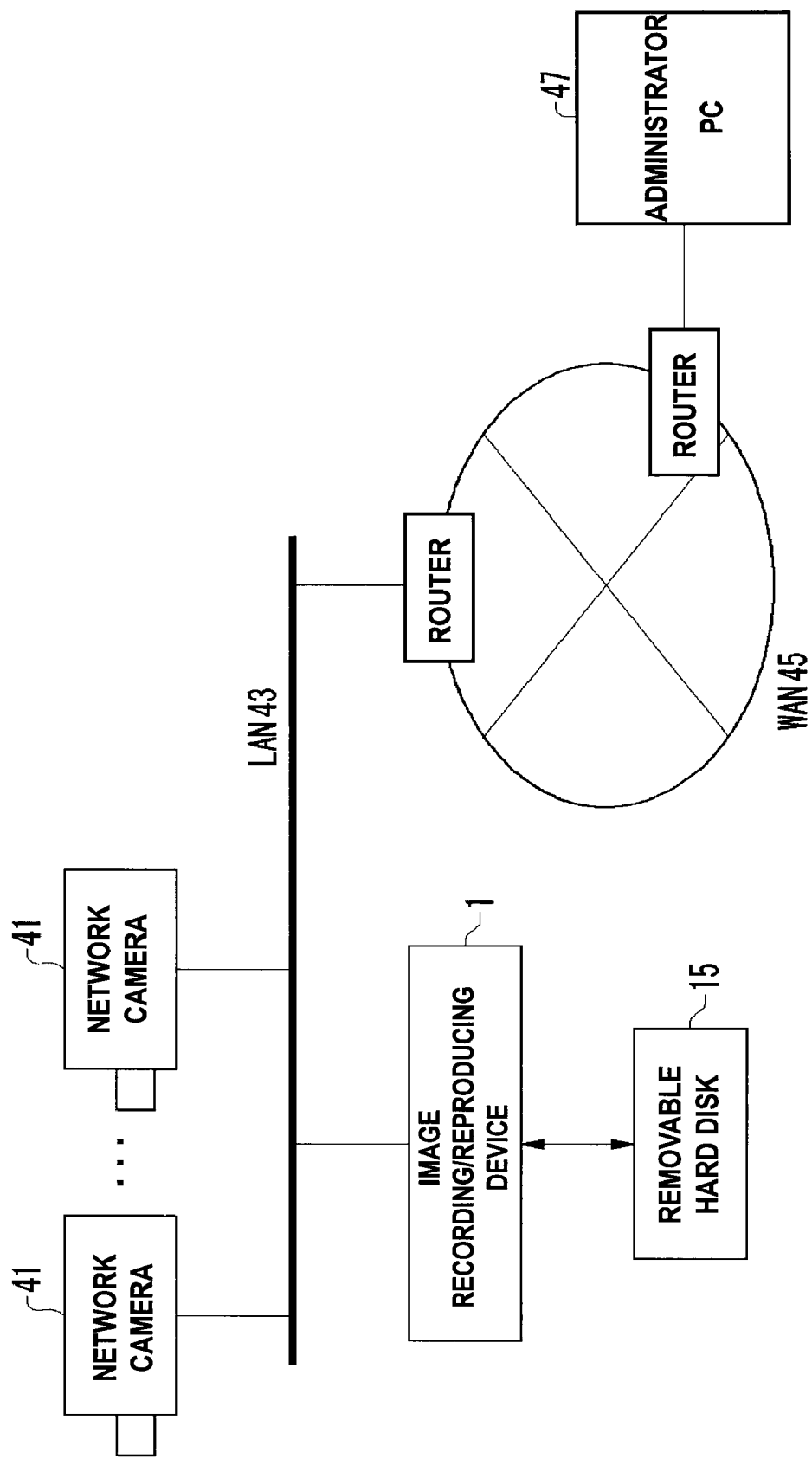
FIG. 4 shows a network-type image recording/reproducing system that is provided with the image recording/reproducing device.

FIG. 4 shows an example of a network-type image recording system that is provided with the image recording/reproducing device 1 of the embodiment. In the example of FIG. 4, the image recording/reproducing device 1 is a network-type device. The image recording/reproducing device 1 and a plurality of network cameras 41 are connected to a LAN 43. The LAN 43 is connected to an administrator PC (personal computer) 47 via a WAN 45. Images from the network cameras 41 are recorded in the image recording/reproducing device 1, and are sent to the administrator PC 47. The administrator PC 47 controls the network cameras 41 and the image recording/reproducing device 1.

A configuration associated with the error detection characteristic of the invention will next be described referring to FIG. 1, which shows in a software manner a function structure associated with the error detection provided on the main controller 13.

As shown in the figure, the main controller 13 has a disk error detector 51, a timer 53, a mount status detector 55, an error type discriminator 57, and an error handler (an error processing section) 59.

The disk error detector 51 detects the occurrence of a disk error depending on whether the removable hard disk 15 can be recognized or not. More specifically, if no reply is received from the removable hard disk 15 even when a Write or other command is executed, the disk error detector 51, determining that the removable hard disk 15 cannot be recognized, detects a disk error.

The disk error detector 51 uses the timer 53 for the determination of the recognition. If a timeout occurs for a command process, the disk error detector 51 determines that a disk error has occurred. The timeout condition (time) is set in advance to a value allowing for the response time of the hard disk.

The mount status detector 55 detects a disk mount status of the disk mount 3. This mount status detector 55 detects the presence or absence of the removable hard disk 15 as a disk mount status. In the embodiment, the above write-protect switch 19 is used to detect the disk mount status.

The mount status detector 55 acquires the status of the write-protect switch 19 detected by the write protect detector 7. More in detail, information on the status of the write-protect switch 19 is obtained as status information from the register 11 by the port driver 23 in FIG. 2. This information on the status of the write-protect switch 19 is acquired by the mount status detector 55. Then, if it is detected by the write protect detector 7 that the write-protect switch 19 is in the Enable state, the mount status detector 55 determines that the removable hard disk 15 is mounted (the removable hard disk 15 exists). If the Enable state is not detected, the mount status detector 55 determines that the removable hard disk 15 is not mounted (the removable hard disk 15 does not exist).

The error type discriminator 57, based on the disk mount status detected by the mount status detector 55, discriminates an error type of the disk error detected by the disk error detector 51. If the removable hard disk 15 exists in the disk mount 3, the error type discriminator 57 determines that the error type is disk failure. If the removable hard disk 15 has become nonexistent in the disk mount 3, the error type discriminator 57 determines that the error type is disk separation. As previously described, a disk separation error (disk-removed-error) is a disk error caused by the removable hard disk being pulled out without going through a prescribed procedure.

Enlarging further on this point, before the occurrence of a disk separation error, the removable hard disk 15 exists and the Enable state of the write-protect switch 19 is detected. When a disk separation error occurs, the removable hard disk 15 becomes nonexistent and the Enable state becomes undetectable. Therefore, the error type discriminator 57 compares the disk mount status between before and after disk error detection performed by the disk error detector 51. If the removable hard disk 15 existed before and does not exist after the error detection (if the write-protect switch detection result was the Enable state before and is not the Enable state after the error detection), the error type discriminator 57 determines that the error type is disk separation.

The error handler 59 performs error handling (error processing) in accordance with the error type discriminated by the error type discriminator 57.

The error handling is typically a process of sending out warnings. For example, the error handler 59 turns on an LED or other warning light (not shown) provided on the image recording/reproducing device 1. In addition, the error handler 59 turns on the warning light in manners different between a disk failure error and a disk separation error (causes the warning light to perform different lighting operations). Alternatively, the error handler 59 may sound a buzzer or other warning sound from a speaker (not shown) as a warning. In this case, the error handler 59 suitably emits the warning sound in manners (operations) different between the two errors by sounding different sounds, changing the number of sounding or sounding interval, or the like (same as above).

The error handler 59 may display a warning on a display (not shown) provided on the image recording/reproducing device 1. Also in this case, a disk failure error and a disk separation error are distinctly displayed.

The error handler 59 may warn by externally notifying of an error occurrence and the type thereof (disk failure or disk separation). For example, a pop-up warning is displayed on a browser of the administrator PC 47 in FIG. 4. Also in this case, warning displays are performed in manners different between a disk failure error and a disk separation error.

The error handling is not limited to the process of sending out warnings. Another example of error handling is a process of recording an error history. An error log may be recorded in a storage device of the image recording/reproducing device 1. The error handler 59 also records information on whether the error type is disk failure or disk separation. The error log may be externally outputted. The error log may be sent to the administrator PC 47 (including a portable telephone) in FIG. 4 by e-mail.

The above is a detailed description of the configuration of each part of the image recording/reproducing device 1. An operation of the image recording/reproducing device 1 will next be described. In this description, the operation of operation start and operation stop of the removable hard disk 15 will be described first, and then the operation associated with the error detection of the invention will be described.

At the time of operation start, the removable hard disk 15 is mounted in the disk mount 3 of the image recording/reproducing device 1, and the operation start action is performed. In the example of the embodiment, a user pushes the operation button of the front operation unit 9 as the operation start action. When the operation button is pushed, the image recording/reproducing device 1 performs a process of recognizing the removable hard disk 15. The detection process of the write-protect switch 19 is also performed during this recognition process.

Figure 5:
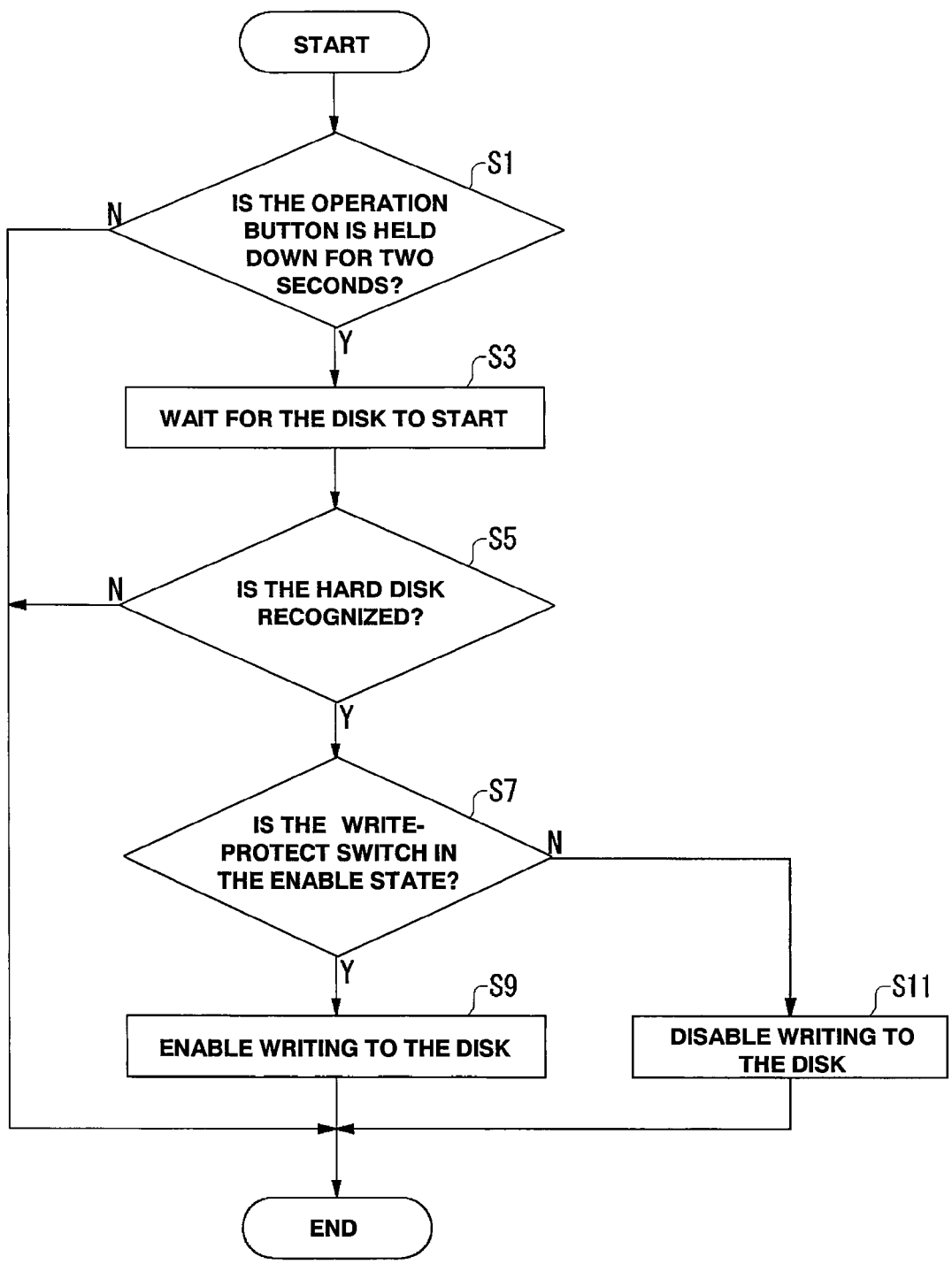
FIG. 5 shows an operation when the operation of the removable hard disk is started.

FIG. 5 shows one example of the operation of operation start. In FIG. 5, if the operation button is held down for two seconds or more (Yes at S1), the image recording/reproducing device 1 enters a state of waiting for the disk to start (S3), and then the removable hard disk 15 is recognized (Yes at S5). The main controller 13 then determines whether the write-protect switch 19 is in the Enable state or not (S7).

If the write-protect switch 19 is in the Enable state, the main controller 13 enables writing to the removable hard disk 15 (S9). If the write-protect switch 19 is not in the Enable state, the main controller 13 disables writing to the removable hard disk 15 (S11).

The operation of operation stop will next be described. At the time of operation stop, the operation stop action is first performed. In the embodiment, the operation stop action is the same as the operation start action, that is, a user pushes the operation button of the front operation unit 9. If the operation stop action is performed, a process to stop the operation is performed inside the image recording/reproducing device 1. For example, required disk management information is written into a prescribed management area of the removable hard disk 15. After the operation stop action, the removable hard disk 15 is pulled out of the disk mount 3.

The above operation start and stop actions are performed at the time of disk replacement. At the time of disk replacement, first the operation stop action is performed on a disk to be replaced, and then the operation start action is performed with a new disk.

Figure 6:
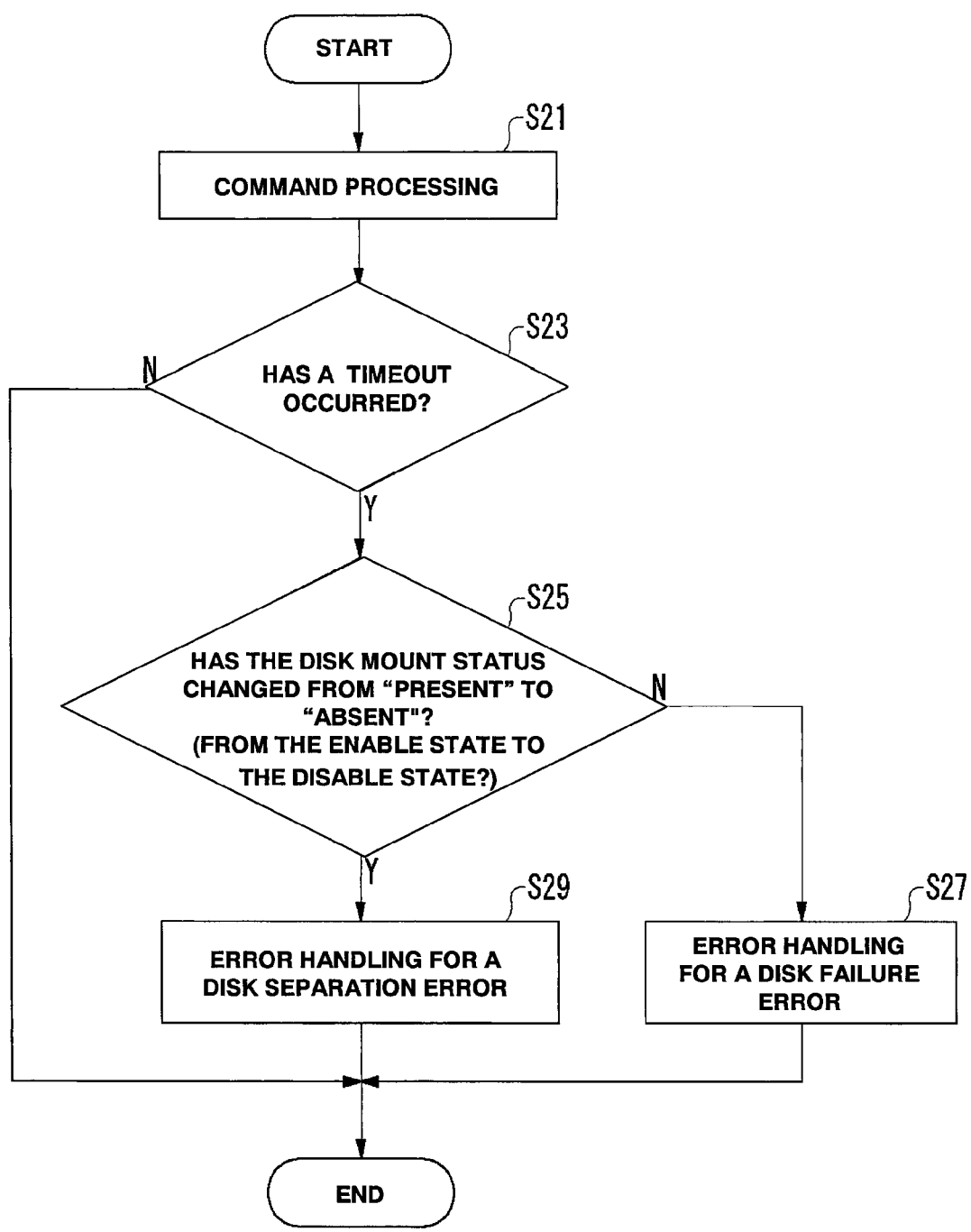
FIG. 6 shows an operation of failure detection for the removable hard disk.

Referring to a flowchart in FIG. 6, the operation associated with the error detection will next be described. In FIG. 6, if a command (Write, Read, or the like) for the removable hard disk 15 is processed (S21), the disk error detector 51 uses the timer 53 to determine whether a timeout has occurred or not (S23). If a timeout occurs, the disk error detector 51 cannot recognize the removable hard disk 15 and determines that a disk error has occurred.

If a timeout has occurred at the step S23, the error type discriminator 57 determines the error type. In this example, the error type discriminator 57, based on a detection result obtained by the mount status detector 55, determines whether the mount status of the removable hard disk 15 has changed from "present" to "absent" or not (S25). As shown in the figure, if a detection result obtained by the write protect detector 7 changes from the Enable state to the Disable state between before and after the disk error detection at the step S23, the mount status changes from "present" to "absent."

If the determination at the step S25 is No, the removable hard disk 15 exists. Accordingly, the error type discriminator 57 determines that the error type is disk failure, and the error handler 59 performs error handling for disk failure (S27).

If the determination at the step S25 is Yes, the removable hard disk 15 has become nonexistent. Accordingly, the error type discriminator 57 determines that the error type is disk separation, and the error handler 59 performs error handling for disk separation (S29).

In error handling, as described before, warnings may be outputted via a network to the administrator PC 47 or other external devices. As illustrated in FIG. 4, in an actual operation of a network-type image recording system, there are cases where the image recording/reproducing device 1 is provided in a location away from the administrator PC 47. In such a case, suppose that an operator pulls out the removable hard disk 15 by mistake without performing the operation stop action, causing a disk separation error. For example, a disk separation error occurs in a case where the image recording/reproducing device 1 has a plurality of disk slots and if an operator pulls out a disk being in recording operation by mistake instead of a disk to be replaced. In such a case, the embodiment allows the distant administrator to be alerted immediately via the network, and allows error information to be stored in a history. Moreover, the administrator can promptly instruct the operator to deal with the error.

There has been described the image recording/reproducing device 1 according to the embodiment of the invention. In the embodiment, the mount status detector 55 and the error type discriminator 57 are provided in addition to the disk error detector 51. The disk error detector 51 is configured to detect whether the removable hard disk 15 can be electrically recognized or not, whereas the mount status detector 55 is configured to detect a physical presence or absence of the removable hard disk 15 as a disk mount status. Then the error type discriminator 57, based on the disk mount status, determines that the error type is disk separation error if the removable hard disk 15 has become nonexistent. The error handler 59 then performs error handling in accordance with the error type. The error handling is, for example, sending out warnings or recording an error history. As above, by performing disk mount status detection and determination based on the detection result, a disk separation error of the removable hard disk 15 can be discriminated.

In the embodiment, if the removable hard disk 15 exists when the disk error is detected by the disk error detector 51, the error type discriminator 57 determines that the error type is disk failure. This configuration allows a disk separation error and a disk failure error to be discriminated from each other to perform different error handling for each error.

In the embodiment, the image recording/reproducing device 1 has the write protect detector 7 for detecting a status of the write-protect switch 19 in the removable hard disk 15, and the mount status detector 55 detects the disk mount status based on a detection result obtained by the write protect detector 7. This configuration allows the disk mount status to be detected by using the detection mechanism for the write-protect switch 19 and allows the disk error type to be determined. In this configuration, the detection mechanism for the write-protect switch 19 is used for both Write Enable/Disable determination and disk error type determination. This allows an error type to be determined without increasing the number of components, and therefore an error type can be determined in a simple configuration.

In the embodiment, the error handler 59, as the error handling, sends out warnings that differ between a disk separation error and a disk failure error. This configuration allows an error occurrence to be dealt with quickly.

By the way, as described above, the present embodiment uses a detection result of the write-protect switch 19 to detect the disk mount status. This detection result represents whether the write-protect switch 19 is in the Write "Enable" state or not. However, the write protect detector 7 of the embodiment does not detect whether the write-protect switch 19 is in the Write "Disable" state or not (To be supplementary, if in FIG. 5 the step S5 is Yes and the step S7 is No, the system can determine Write Disable even if the write protect detector 7 cannot physically detect the Write "Disable" state. The Write Enable/Disable control can therefore be performed even if the Write "Disable" state cannot be physically detected). Consequently, the image recording/reproducing device 1 can physically detect the disk mount status for the removable hard disk 15 whose write-protect switch 19 is in the Write "Enable" state. However, the image recording/reproducing device 1 cannot determine the disk mount status if the write-protect switch 19 is in the Write "Disable" state. Thus, a disk separation error of the removable hard disk 15 being in the Write "Disable" state cannot be detected in the embodiment.

With respect to the foregoing, it is a problem in the image recording/reproducing device 1 that the removable hard disk 15 being in the Write "Enable" state is pulled out to cause failure in image recording. On the other hand, it is not considered to be a big problem that the removable hard disk 15 being in the Write "Disable" state is pulled out. This is because the removable hard disk 15 being in the Write "Disable" state is in a read-only state and an image-recording loss does not occur even if a disk separation error occurs. Therefore, the present invention excludes the removable hard disk 15 being in the Write "Disable" state from disk separation error discrimination, and in exchange for this, the present invention can implement the disk existence determination that makes use of the write protect detection mechanism. This allows for disk existence determination and error type determination based thereon in a simple configuration without increasing the number of components.

However, within the scope of the invention, whether the write-protect switch 19 is in the Write "Disable" state or not may also be detected by the write protect detector 7. In this case, a disk separation error can be discriminated also for the removable hard disk 15 being in the Write "Disable" state.

Moreover, within the scope of the invention, the mount status detector 55 may detect the disk mount status with a configuration which does not make use of the detection mechanism for the write-protect switch 19. There may be provided a switch, sensor, or the like that physically detects the removable hard disk 15 itself. Also in this case, a disk separation error can be discriminated also for the removable hard disk 15 being in the Write Disable state.

While there has been described what is at present considered to be preferred embodiments of the invention, it will be understood that various modifications and variations may be made thereto, and it is intended that appended claims cover all such modifications and variations as fall within the true spirit and scope of the invention.

Industrial Applicability

As stated above, the image recording/reproducing device according to the invention is provided with the mount status detector and the error type discriminator that uses a detection result thereof in addition to the disk error detector, and can therefore discriminate a disk separation error that is specific to removable hard disks. The device has the above advantage and is useful, for example, as a network-type image recording/reproducing device or the like.

The invention claimed is:

1. An image recording/reproducing device comprising:
   a disk mount in which a removable hard disk for recording an image is mounted;
   a disk error detector for detecting an occurrence of a disk error depending on whether the removable hard disk can be recognized or not;
   a write protect detector for detecting whether a write-protect switch in the removable hard disk is in a Write Enable state or not;
   a mount status detector for detecting a presence or absence of the removable hard disk as a disk mount status based on a detection result obtained by the write protect detector;
   an error type discriminator for, based on the disk mount status detected by the mount status detector, discriminating an error type of the disk error detected by the disk error detector, and determining that the error type is disk separation if the removable hard disk has become nonexistent; and
   an error handler for performing error handling in accordance with the error type discriminated by the error type discriminator.

2. The image recording/reproducing device according to claim 1, wherein the error type discriminator compares the disk mount status between before and after disk error detection performed by the disk error detector, and determines that the error type is disk separation if the removable hard disk existed before and does not exist after the error detection.

3. The image recording/reproducing device according to claim 1, wherein if the removable hard disk exists when the disk error is detected by the disk error detector, the error type discriminator determines that the error type is disk failure.

4. The image recording/reproducing device according to claim 3, wherein the error handler, as the error handling, sends out warnings that differ between a disk separation error and a disk failure error.

5. A disk error detection device provided on an image recording/reproducing device having a disk mount in which a removable hard disk is mounted for recording an image, the disk error detection device comprising:
   a disk error detector for detecting an occurrence of a disk error depending on whether the removable hard disk can be recognized or not;
   a write protect detector for detecting whether a write-protect switch in the removable hard disk is in a Write Enable state or not;
   a mount status detector for detecting a presence or absence of the removable hard disk as a disk mount status based on a detection result obtained by the write protect detector; and
   an error type discriminator for, based on the disk mount status detected by the mount status detector, discriminating an error type of the disk error detected by the disk error detector.

6. A disk error detection method for detecting a disk error in an image recording/reproducing device having a disk mount in which a removable hard disk is mounted for recording an image, the disk error detection method comprising:
   detecting an occurrence of a disk error depending on whether the removable hard disk can be recognized or not;
   detecting whether a write-protect switch in the removable hard disk is in a Write Enable state or not;
   detecting a presence or absence of the removable hard disk as a disk mount status based on a detection result of the status of the write-protect switch; and
   discriminating an error type of the disk error based on the detected disk mount status.

* * * * *